US012728774B2

(12) United States Patent
Liu

(10) Patent No.: US 12,728,774 B2
(45) Date of Patent: Sep. 8, 2026

(54) MULTIFUNCTIONAL CHILD CARRIER WITH SAFETY PROMPT FUNCTION

(71) Applicant: SUNNYLOVE BABY PRODUCTS ZHUHAI CO., LTD, Zhuhai City (CN)

(72) Inventor: Xiu Ping Liu, Zhuhai City (CN)

(73) Assignee: SUNNYLOVE BABY PRODUCTS ZHUHAI CO., LTD, Zhuhai City (CN)

( * ) Notice: Subject to any disclaimer, the term of this patent is extended or adjusted under 35 U.S.C. 154(b) by 140 days.

(21) Appl. No.: 18/967,658

(22) Filed: Dec. 4, 2024

(65) Prior Publication Data

US 2025/0187504 A1 Jun. 12, 2025

(30) Foreign Application Priority Data

Dec. 7, 2023 (CN) ........................ 202323343154.4

(51) Int. Cl.
*B60N 2/28* (2006.01)

(52) U.S. Cl.
CPC ......... *B60N 2/2806* (2013.01); *B60N 2/2821* (2013.01); *B60N 2/2848* (2013.01); *B60N 2/2878* (2013.01)

(58) Field of Classification Search
CPC .. B60N 2/2806; B60N 2/2821; B60N 2/2848; B60N 2/2878; B60N 2/2803; B60N 2/2812; B60N 2/2818
See application file for complete search history.

(56) References Cited

U.S. PATENT DOCUMENTS

| | | | | |
|---|---|---|---|---|
| 7,387,315 | B2 * | 6/2008 | Nett | B60N 2/2806 24/598.2 |
| 7,439,866 | B2 * | 10/2008 | Wallner | B60N 2/0025 180/271 |
| 10,730,414 | B2 * | 8/2020 | Pleiman | B60N 2/286 |
| 11,479,152 | B2 * | 10/2022 | Urrea | B60N 2/2821 |
| 12,179,644 | B2 * | 12/2024 | Hutchinson | B60N 2/2803 |
| 12,643,438 | B2 * | 6/2026 | Mchugh | B60N 2/2821 |
| 2023/0271534 | A1 * | 8/2023 | Lawrence | B60N 2/002 297/183.2 |
| 2025/0135969 | A1 * | 5/2025 | Liu | B60N 2/2884 |
| 2025/0326336 | A1 * | 10/2025 | Chen | B60N 2/2821 |
| 2026/0152099 | A1 * | 6/2026 | Tanner | B60N 2/2869 |

* cited by examiner

*Primary Examiner* — David R Dunn
*Assistant Examiner* — Jessica Kathryn Thompson
(74) *Attorney, Agent, or Firm* — Che-Yang Chen

(57) ABSTRACT

A multifunctional child carrier includes a carrier body, an adjustment mechanism, a seat belt fitting part and a seat belt interference assembly, the carrier body includes a seat part, a backrest part, and a back support panel provided with a headrest portion and is pivotally mounted to the backrest part to move between a highest angle position and a lowest angle position, the seat belt interference assembly is configured to allow a car seat belt to fit with the seat belt fitting part when the back support panel is at the highest angle position, and to block the car seat belt from fitting with the seat belt fitting part when the back support panel is not at the highest angle position.

20 Claims, 20 Drawing Sheets

MULTIFUNCTIONAL CHILD CARRIER WITH SAFETY PROMPT FUNCTION

CROSS REFERENCE OF RELATED APPLICATION

This application is a non-provisional application that claims priority under 35 U.S.C. § 119 to China application number CN202323343154.4, filing date Dec. 7, 2023, wherein the entire content of which is expressly incorporated herein by reference.

BACKGROUND OF THE PRESENT INVENTION

Field of Invention

The present invention relates to field of children's safety travel products, and more particularly to a multifunctional child carrier with safety prompt function.

Description of Related Arts

Child safety seats or carriers are essential device for ensuring the safety of children during car travel. These child carriers typically include a seat portion, a backrest, and a headrest positioned on the backrest to support the child's head. In current designs, the headrest and backrest are usually fixedly connected. To enhance comfort, many child carriers feature a adjustment mechanism that allows the backrest to move between a highest position and a lowest position. Safety regulations often require the backrest to be set to the highest position when the carrier is secured in a vehicle, particularly during travel. Additionally, the child carrier must be properly secured to the vehicle using a car seat belt to ensure safety.

However, in current designs, the actions of adjusting the backrest and securing the child carrier with the car seat belt are typically independent and unlinked, lacking any form of interrelated reminder functionality. While users generally understand the importance of securing the child carrier with the seat belt and tend to perform this task, they may overlook adjusting the backrest to its highest position, either due to negligence or a lack of safety awareness. This oversight creates a potential safety risk.

SUMMARY OF THE PRESENT INVENTION

The present invention aims to overcome the shortcomings of the prior art and provide a multifunctional child carrier with safety prompt function. This child carrier adopts an adjustment mechanism in conjunction with a seat belt interference assembly. In the car seat usage state, the seat belt of the vehicle needs to be used in conjunction with the seat belt fitting part. Before securing the seat belt, the back support panel must first be adjusted to the highest angle position. Only then is the seat belt interference assembly released, allowing the seat belt of the vehicle to pass through the seat belt fitting part along a predetermined path. This design serves as a safety reminder, preventing safety issues that may arise if the back support panel is not adjusted to the highest angle position during use.

Thus, the safety of the occupants is ensured.

This present invention provides a multifunctional child carrier with safety prompt function. The child carrier, which has both a stroller usage mode and a car seat usage state, comprises a carrier body which comprises a seat part and a backrest part. An inner side of the backrest part is equipped with a back support panel. An adjustment mechanism is arranged between the back support panel and the backrest part to adjust the highest and lowest angle settings between them. The adjustment mechanism is configured to lock the back support panel in the highest angle position after the back support panel rotates with respect to the backrest part when in the car seat usage state. The child carrier also comprises a seat belt fitting part located on the carrier body for fitting with a car seat belt, and a seat belt interference assembly. The seat belt interference assembly is configured to allow the car seat belt to fit with the seat belt fitting part when the back support panel is at the highest angle, and to block the car seat belt from fitting with the seat belt fitting part when the back support panel is not at the highest angle position.

In the aforementioned multifunctional child carrier with safety prompt function, the adjustment mechanism is further configured to allow the back support panel to be adjusted between the highest and lowest angles when in the stroller usage state.

In the aforementioned multifunctional child carrier with safety prompt function, a lower side of the back support panel is rotatably connected to the backrest portion. The adjustment mechanism has a movable sliding groove at the back support panel and a fixed sliding groove at the backrest portion. The movable sliding groove and the fixed sliding groove intersect, and an adjustment slider is slidably coupled with both of the movable sliding groove and the fixed sliding groove. When the back support panel is at the highest angle position, a locking mechanism on the backrest portion locks the adjustment slider with respect to the backrest portion.

In the aforementioned multifunctional child carrier with safety prompt function, the locking mechanism comprises a locking block which is slidably positioned at an upper part of the fixed sliding groove. When the back support panel is at the highest angle position, the locking block prevents the adjustment slider from moving. A blocking reset spring is provided between the locking block and the backrest part, and the backrest part is equipped with an unlocking linkage button.

In the aforementioned multifunctional child carrier with safety prompt function, the seat belt interference assembly is configured to be linked with the adjustment mechanism to release the interference when the back support panel is at the highest angle position with respect to the backrest portion.

In the aforementioned multifunctional child carrier with safety prompt function, the seat belt fitting part has a seat belt fitting slot at the carrier body through which the vehicle seat belt passes. The seat belt interference assembly is configured to open or close this seat belt fitting slot.

In the aforementioned multifunctional child carrier with safety prompt function, the seat belt interference assembly comprises an interference block slidable on the carrier body to open or close the seat belt fitting slot. The interference block is equipped with a reset spring to maintain the seat belt fitting slot in a closed state, and the backrest portion is equipped with a movable unlocking component connected directly or indirectly to the interference block. This unlocking component is configured to release the interference block when the back support panel is at the highest angle position.

In the aforementioned multifunctional child carrier with safety prompt function, an operation instruction label is provided on the carrier body near the seat belt interference assembly, guiding the user on how to disengage the seat belt interference assembly from the vehicle's seat belt path.

In the aforementioned multifunctional child carrier with safety prompt function, the child carrier further comprises a blocking element at a bottom of the carrier body to block the connection between the carrier body and the car seat or an independent base. A locking unit is provided between the blocking element and the carrier body. This mechanism is configured to unlock and release the blocking element when the back support panel is at the highest angle position, allowing the blocking element to be released from the locked state.

In the aforementioned multifunctional child carrier with safety prompt function, the locking unit has a locking hole at the bottom of the carrier body and comprises a locking slider on the blocking element that can be inserted into the locking hole to lock the blocking element. The locking slider is kept in the locking hole by a spring mechanism. The locking slider can be unlocked by the adjustment mechanism.

Compared to the prior art, this present invention has the following advantages.

The present invention adopts the adjustment mechanism to link with the seat belt interference assembly. In the car seat usage state, the vehicle seat belt must pass through the seat belt fitting part for securing, but before doing so, the back support panel must be adjusted to the highest angle position. This action releases the seat belt interference assembly, allowing the seat belt to pass through the fitting component, serving as a safety reminder. This design effectively prevents safety issues that may arise from forgetting to adjust the back support panel to the highest angle position, ensuring the safety of the occupant.

In the stroller usage state, the back support panel can be adjusted between the highest angle position and the lowest angle position, allowing for personalized adjustments for a comfortable riding experience.

The operation instruction label effectively guides the user on how to disengage the interference action of the seat belt interference assembly, preventing the user from unknowingly blocking the seat belt fitting part and making improper adjustments when securing the child carrier.

Still further objects and advantages will become apparent from a consideration of the ensuing description and drawings.

These and other objectives, features, and advantages of the present invention will become apparent from the following detailed description, the accompanying drawings, and the appended claims.

BRIEF DESCRIPTION OF THE DRAWINGS

The following detailed description of the specific embodiment of this present invention will be made in conjunction with the accompanying drawings.

DETAILED DESCRIPTION OF THE PREFERRED EMBODIMENT

The following description is disclosed to enable any person skilled in the art to make and use the present invention. Preferred embodiments are provided in the following description only as examples and modifications will be apparent to those skilled in the art. The general principles defined in the following description would be applied to other embodiments, alternatives, modifications, equivalents, and applications without departing from the spirit and scope of the present invention.

Figure 16:
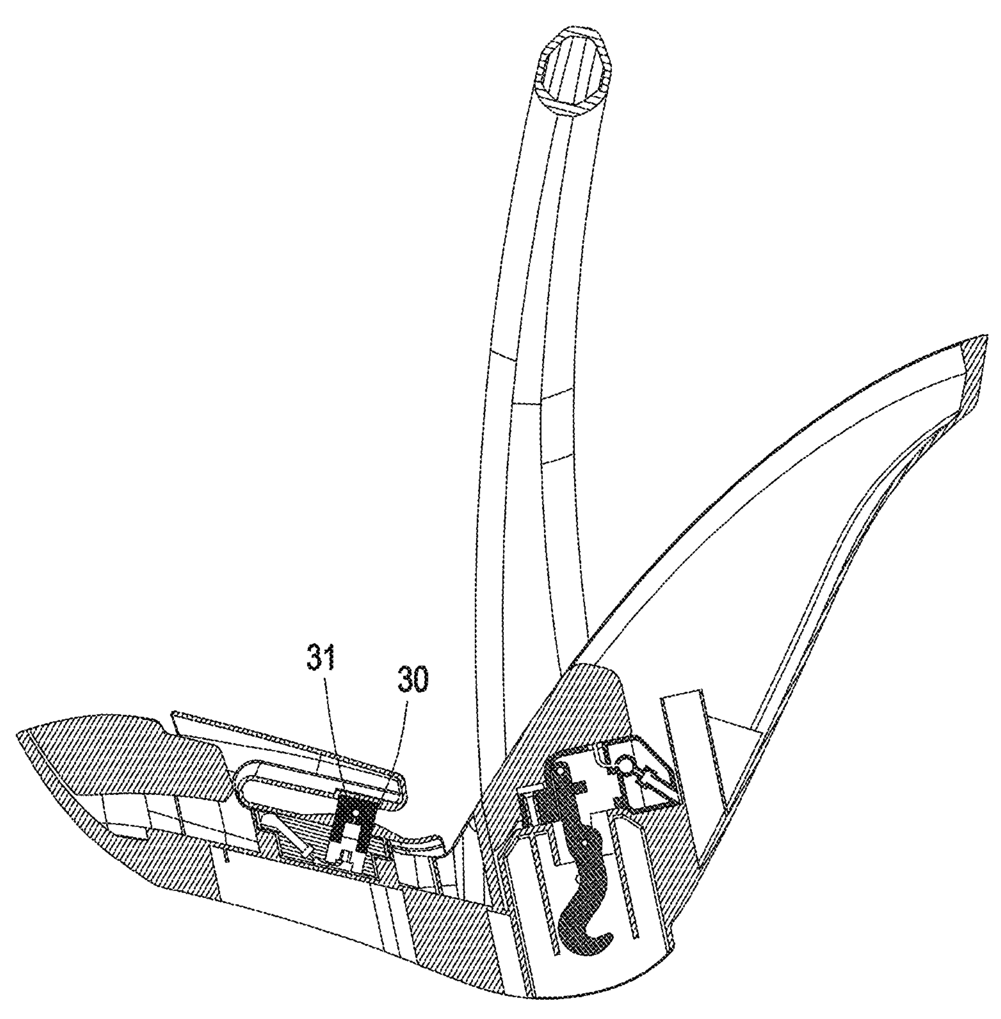
FIG. 16 is a schematic view illustrating a seat belt fitting part 30 of the child carrier being in a close state according to the above preferred embodiment of the present invention.
Figure 17:
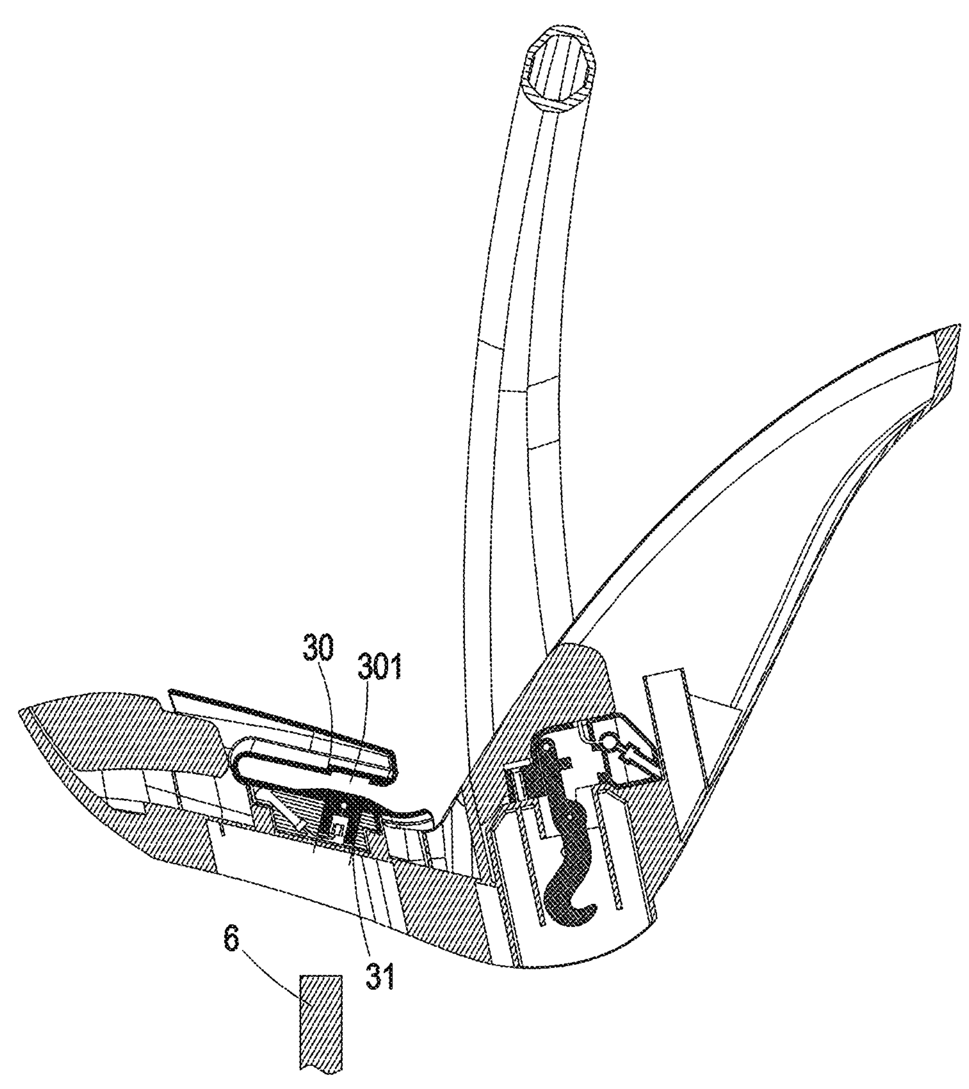
FIG. 17 is a schematic view illustrating the seat belt fitting part 30 of the child carrier being in an open state according to the above preferred embodiment of the present invention.

Referring to FIG. 1 to FIG. 20 of the drawings, a multifunctional child carrier with safety prompt function according to a preferred embodiment of the present invention is illustrated. The child carrier has two usage states: a stroller usage state and a car seat usage state. The child carrier comprises a carrier body 1 which comprises a seat part 11 and a backrest part 12. An inner side of the backrest part 12 is equipped with a back support panel 13. An adjustment mechanism 2 is arranged between the back support panel 13 and the backrest part 12 to adjust the highest and lowest angle settings between them. The adjustment mechanism 2 is configured to lock the back support panel 13 in the highest angle position after the back support panel 13 rotates with respect to the backrest part 12 when in the car seat usage state. The child carrier also comprises a seat belt fitting part 30 located on the carrier body 1 for fitting with a car seat belt 6, and a seat belt interference assembly 3. The seat belt interference assembly 3 is configured to allow the car seat belt 6 to fit with the seat belt fitting part 30 when the back support panel 13 is at the highest angle position, as shown in FIG. 17, and to block the car seat belt 6 from fitting with the seat belt fitting part 30 when the back support panel 13 is not at the highest angle position, as shown in FIG. 16. This present invention uses a linked design with sequential actions, ensuring safety prompts to prevent forgetting to adjust the back support panel 13 to the highest angle position during the car seat usage state, thus preventing safety issues and ensuring the safety of the passenger. As shown in FIGS. 1-6, the adjustment mechanism 2 is also configured to allow the back support panel 13 to switch between the highest and lowest angle settings in the stroller usage state, providing personalized adjustment for a comfortable sitting experience.

The back support panel 13, which is pivotally mounted to the backrest portion 12 in this embodiment, comprises a panel body 131 and a headrest portion 132 connected to the panel body 131 for supporting a head of the child in the child carrier. The back support panel 13 allows for dynamic adjustments to the headrest portion 132. In other words, this pivotal mounting of the back support panel 13 enables the headrest portion 132 to be adjusted to an optimal angle, ensuring that the headrest portion 132 can provide effective and ergonomic support to the child's head, particularly in the stroller usage state.

In the stroller usage state, the adjustment mechanism 2 facilitates the rotation of the back support panel 13, which in turn allows the headrest portion 132 to be adjusted for a more comfortable and supportive angle for the child's head. This pivotal adjustment ensures that the child remains comfortable and stable, even during prolonged use in the stroller configuration.

By adjusting the angle of the headrest portion 132, the child carrier accommodates the child's growth and changing needs, offering personalized support that ensures the child's head is appropriately cushioned and aligned while seated. This provides additional comfort during outings, preventing neck strain and providing a more relaxed seating experience.

In the car seat usage state, when the baby carrier is connected to either the car seat or an independent base on the car seat, the back support panel 13 is pivotally rotated to reach the highest angle position. As an example, this adjustment ensures that the headrest portion 132 is aligned in a substantial upright posture, providing critical support for the baby's head. The substantial upright of the headrest portion 132 is especially important for maintaining the correct posture of the child's head and neck during travel in a vehicle.

This configuration is designed to protect the delicate cervical spine of the baby by minimizing the risk of neck strain or injury, particularly in the event of sudden stops or vehicle impacts. The headrest portion 132, being positioned to be substantial upright, ensures that the baby's head is properly aligned with the spine, thereby helping to reduce the risk of whiplash or other neck-related injuries that can occur during rapid deceleration or collisions.

As shown in FIGS. 1-6, 10, and 11, a lower side of the back support panel 13 is pivotally connected to the backrest part 12. The adjustment mechanism 2 has a movable sliding groove 21 at the back support panel 13 and a fixed sliding groove 22 at the backrest part 12. The movable sliding groove 21 is movable along with the movement of the back support panel 13, while the fixed sliding groove 22 is fixed at the backrest part 12. The movable and fixed sliding grooves 21 and 22 intersect, and an adjustment slider 23 is slidably engaged with both of the movable sliding groove 21 and the fixed sliding groove 22. The backrest part 12 is equipped with a locking mechanism 24 to lock the adjustment slider 23 in place when the back support panel 13 is at the highest angle. During adjustment, the user only needs to pivotally rotate the back support panel 13 with respect to the backrest part 12 around the axis at the lower side of the back support panel 13, flipping it forward or backward until the back support panel 13 is adjusted to the desired angle, making the adjustment process simple and convenient. Additionally, the adjustment slider 23 remains coupled to both the movable and fixed sliding grooves 21 and 22, ensuring a stable and reliable connection between the back support panel 13 and the backrest part 12.

A plurality of locking grooves may be defined between adjacent protrusions at an inner side of one of the movable sliding groove 21 and the fixed sliding groove 22, so as to offer precision control over the inclination angle of the back support panel 12 in the stroller usage state. This allows for fine-tuned adjustment between the highest and lowest angle positions, providing a highly customizable seating position for the baby depending on their activity, whether they are awake, asleep, or resting.

As the adjustment slider 23 moves along both of the movable sliding groove 21 and the fixed sliding groove 22, it can be retained securely in one of the locking grooves when stopped, preventing unintentional movement. This ensures that once the back support panel 12 is adjusted to a desired angle, it remains fixed in that position, contributing to both the safety of the baby and the peace of mind of the caregiver.

Figure 3:
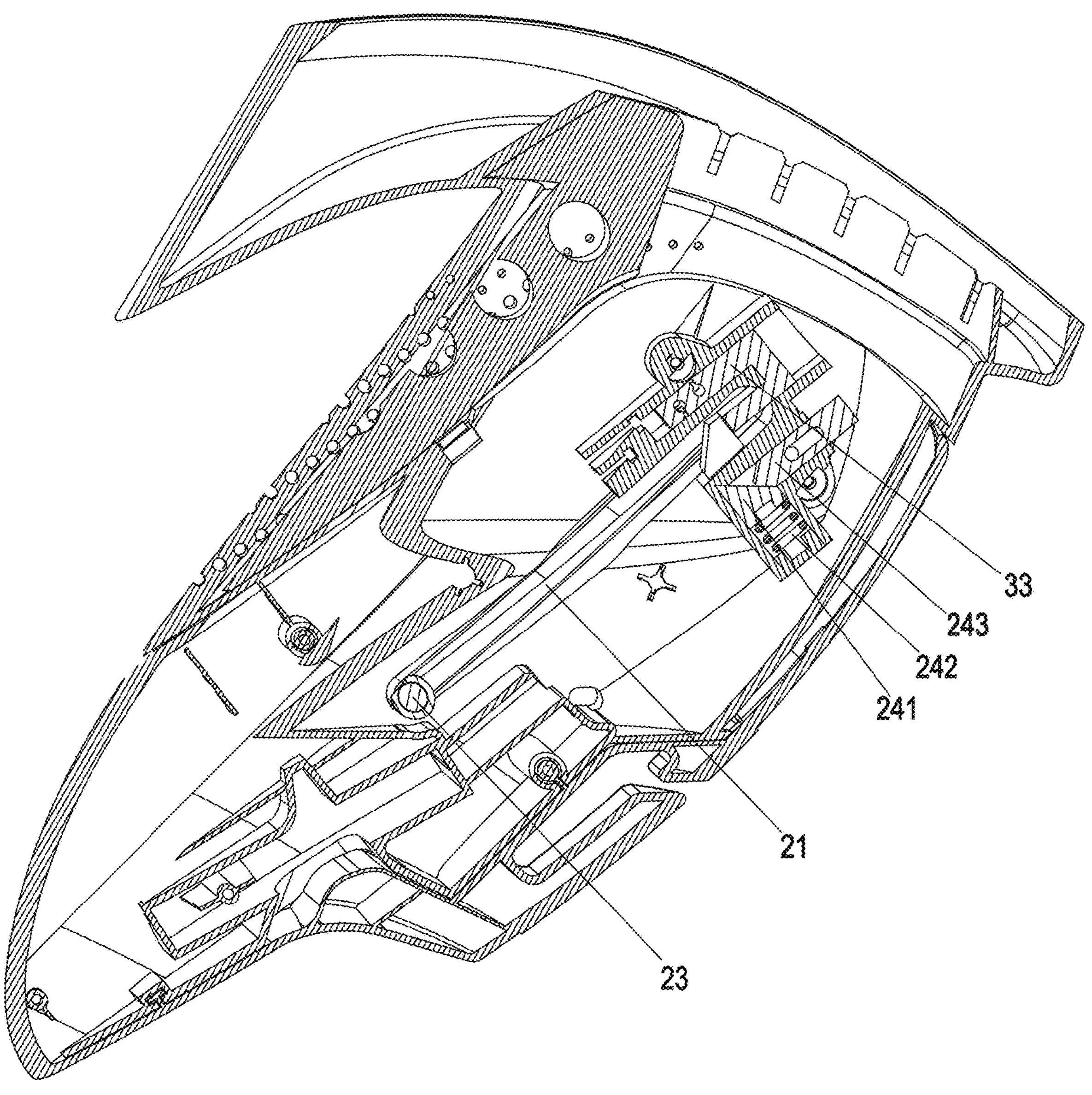
FIG. 3 is another cross-sectional view illustrating the back support panel of the child carrier being at the lowest angle position according to the above preferred embodiment of the present invention.
Figure 6:
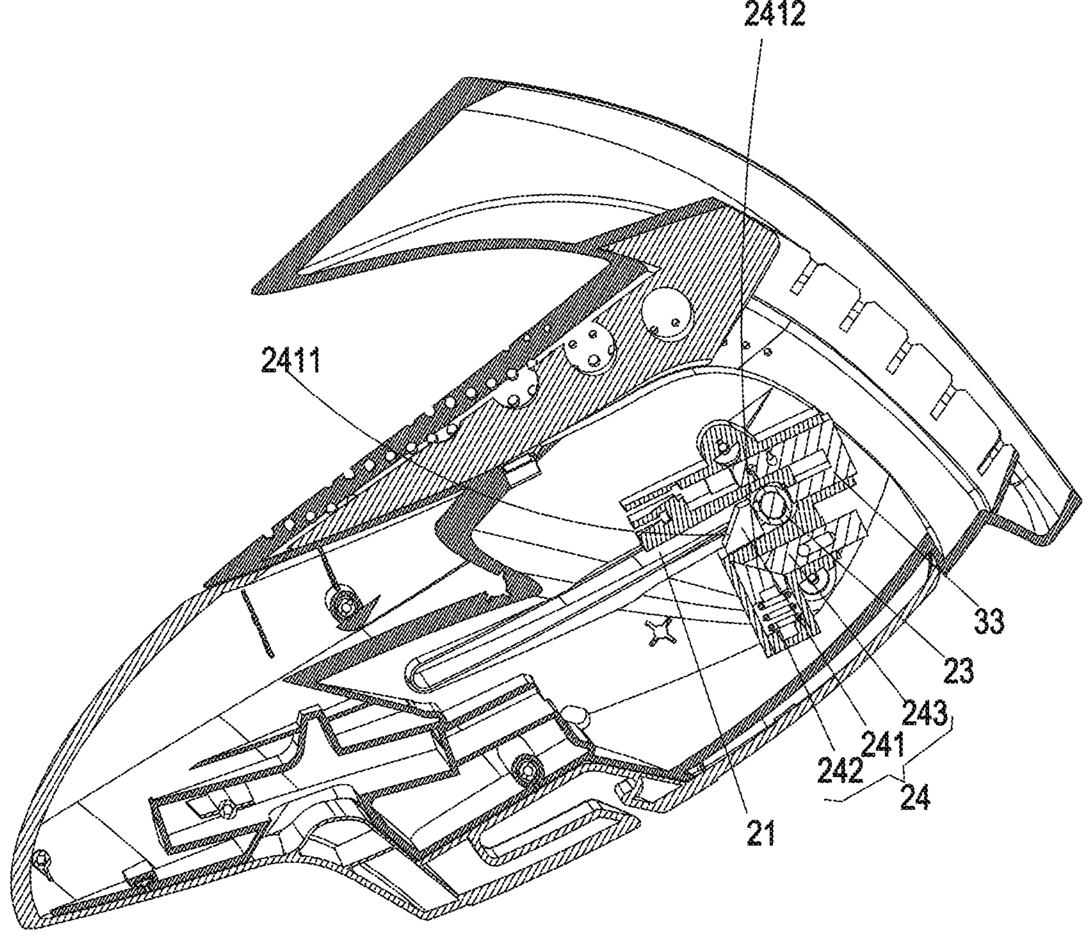
FIG. 6 is another cross-sectional view illustrating the back support panel of the child carrier being at the highest angle position according to the above preferred embodiment of the present invention.
Figure 7:
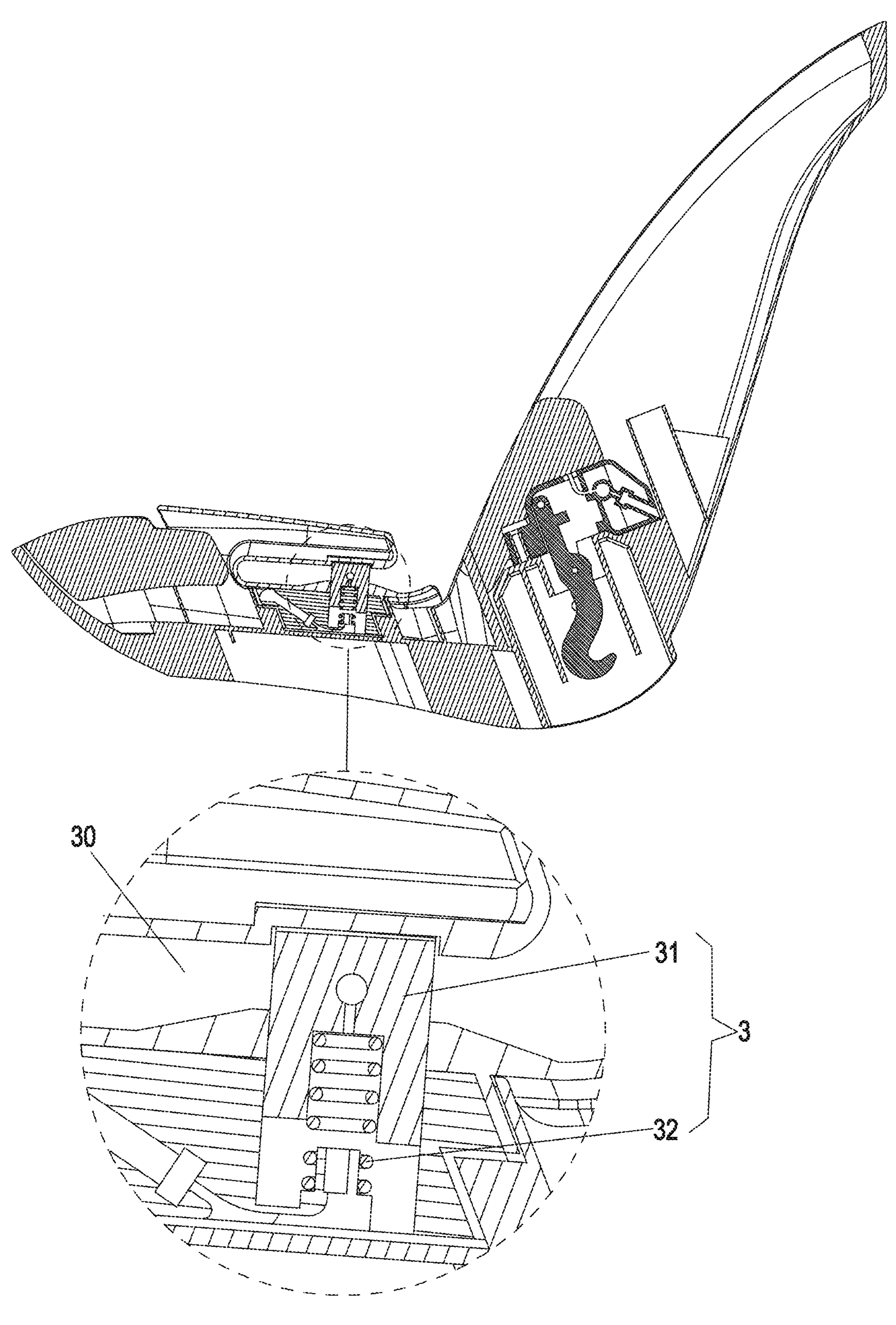
FIG. 7 is a cross-sectional view illustrating a safety belt interference assembly of the child carrier according to the above preferred embodiment of the present invention.

As shown in FIGS. 3 and 6, to better lock the adjustment slider 23, the locking mechanism 24 comprises a locking block 241 which is slidably positioned at an upper part of the fixed sliding groove 22. When the back support panel 13 is at the highest angle position, the locking block 241 prevents the adjustment slider 23 from moving. Between the locking block 241 and the backrest part 12, there is a blocking reset spring 242, and the backrest part 12 is equipped with an unlocking linkage button 243. When pressed, the unlocking linkage button 243 will release the locking block 241 from the adjustment slider 23. A locking end of the locking block 241 is provided with a guiding inclined surface 2411. When the back support panel 13 is adjusted to the highest angle position, the adjustment slide rod 23 acts on the guiding inclined surface 2411, causing the locking block 241 to retract and avoid interference with the adjustment slide rod 23. This design helps prevent interference between the adjustment slide rod 23 and the locking block 241, facilitating smooth movement of the adjustment slide rod 23 to the upper end of the fixed sliding groove 22. When unlocking, the unlocking linkage button 243 is pressed to move with respect to the backrest part 12 to act on an unlocking inclined surface 2412 of the locking block 241, causing an unlocking end of the unlocking linkage button 243 to elastically retract the locking block 241. This action releases the blocking effect of the locking block 241 on the adjustment slide rod 23, thus allowing the adjustment slide rod 23 to move freely.

Figure 4:
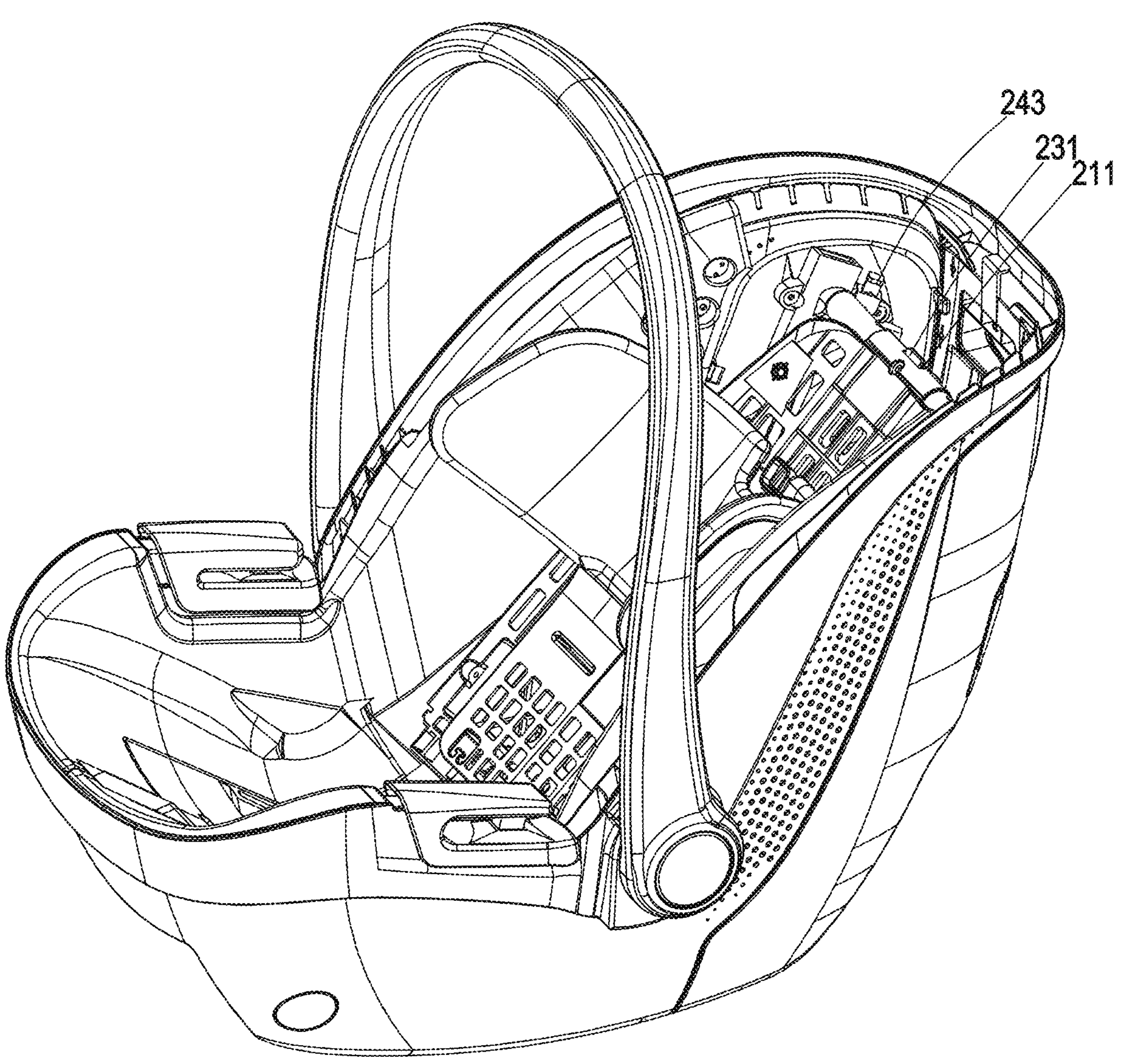
FIG. 4 is a perspective view illustrating the back support panel of the child carrier being at a highest angle position according to the above preferred embodiment of the present invention.
Figure 5:
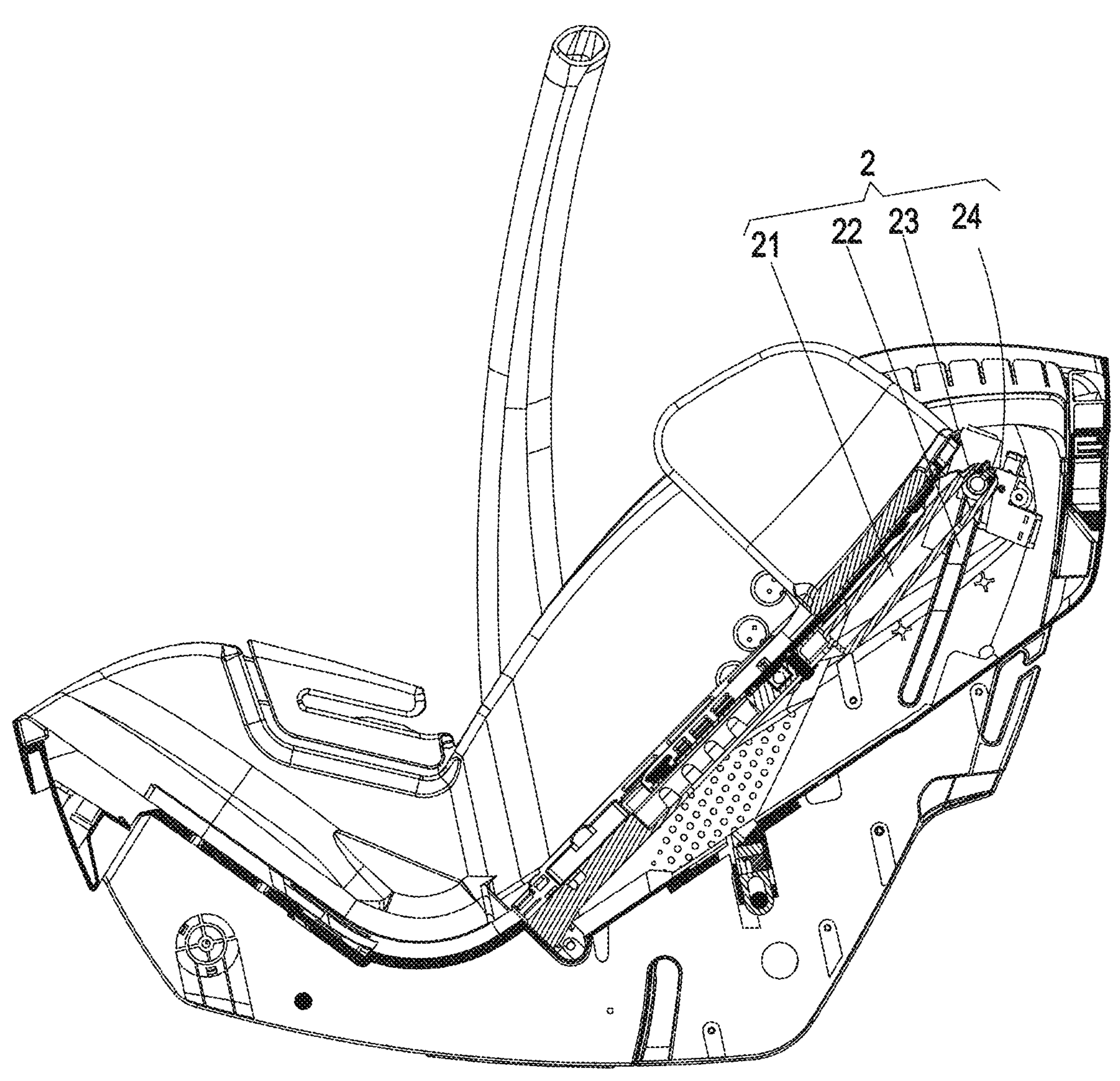
FIG. 5 is a cross-sectional view illustrating the back support panel of the child carrier being at the highest angle position according to the above preferred embodiment of the present invention.
Figure 10:
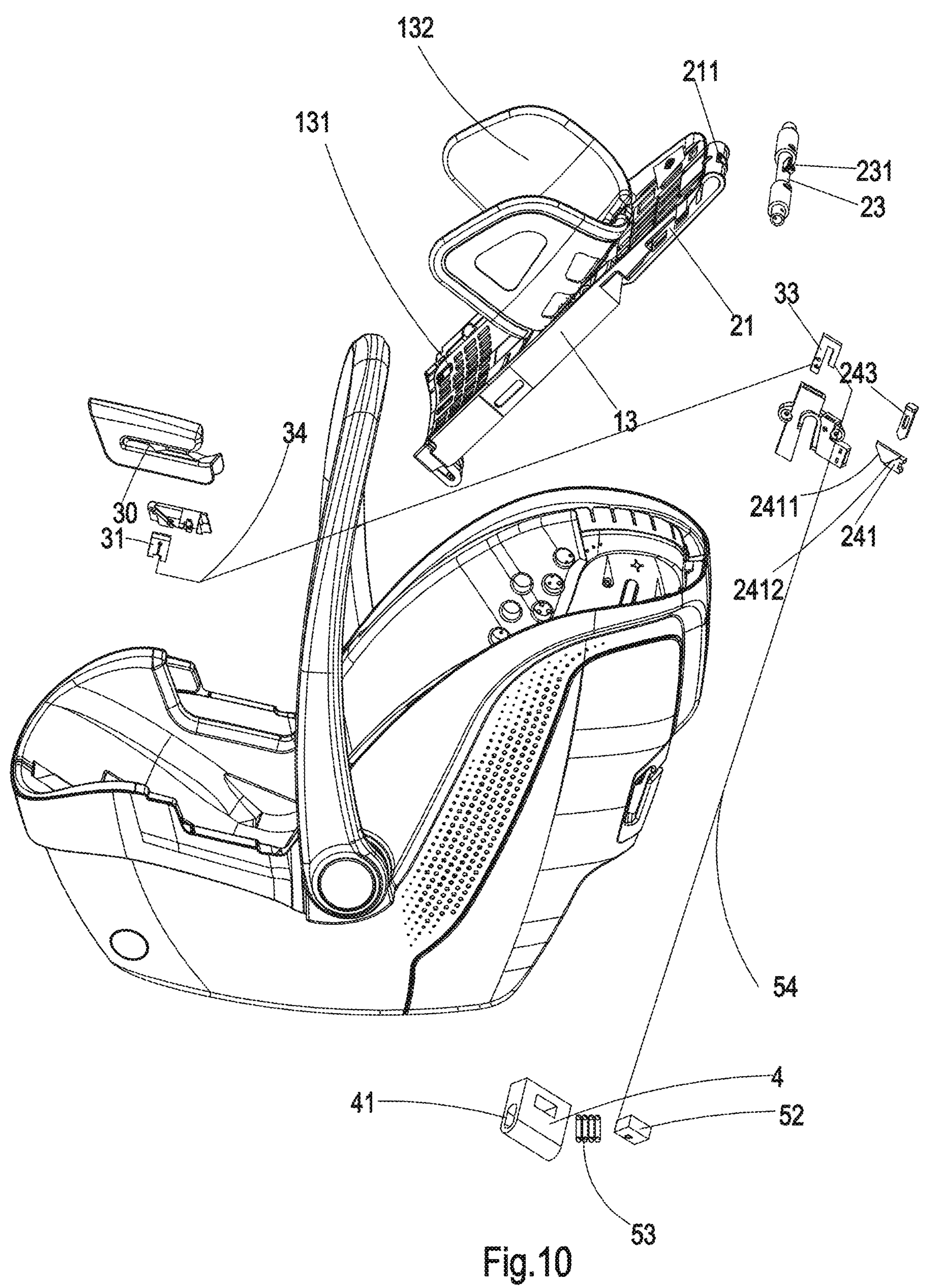
FIG. 10 is an exploded view of the child carrier according to the above preferred embodiment of the present invention.

The guiding inclined surface 2411 and the unlocking inclined surface 2412 are provided at two sides of the locking block 241, and are respectively facing towards the adjustment slider 23 and the unlocking linkage button 243. The adjustment slide rod 23 is configured to move upward to act on the guiding inclined surface 2411 of the locking block 241, the unlocking linkage button 243 is configured to be pressed to move downward to act on the unlocking inclined surface 2412 of the locking block 241. As shown in FIGS. 4, 5, and 10, the adjustment slider 23 has a color indicator block 231, and the upper end of the movable sliding groove 21 has a display window 211. When the back support panel 13 is at the highest angle position, the color indicator block 231 is shown through the display window 211. The color indicator block 231 serves as a warning to ensure safety during use.

Furthermore, to simplify unlocking, the seat belt interference assembly 3 is configured to be unlocked through a linked action with the adjustment mechanism 2 when the back support panel 13 is at the highest angle position with respect to the backrest part 12.

As shown in FIGS. 1, 2, 4, 5, 9, and 10, in order to facilitate the use of the car seat belt 6 with the seat belt fitting part 30, the seat belt fitting part 30 has a seat belt fitting slot 301 at the carrier body 1 for the car seat belt 6 to pass through. The seat belt interference assembly 3 is configured to open or close the seat belt fitting slot 301.

As shown in FIGS. 1, 2, 7, and 10, the seat belt interference assembly 3 comprises an interference block 31 that can slide on the carrier body 1 to open or close the seat belt fitting slot 301, and a reset spring 32 between the interference block 31 and the carrier body 1 to ensure the interference block 31 stays in a closed position, and an unlocking component 33 which is movable on the backrest part 12 and is connected directly or indirectly to the interference block 31. The unlocking component 33 is configured to be linked with the adjustment mechanism 2 and unlock the interference block 31 when the back support panel 13 is at the highest angle position.

As shown in FIG. 10, the seat belt interference assembly 3 comprises a first pulling rope 34 connected between the unlocking component 33 and the interference block 31. When the unlocking component 33 is pushed upward by the adjustment slide rod 23, the unlocking component 33 will drive interference block 31 to move away from the seat belt fitting slot 301 through the first pulling rope 34 which can be embodied as a steel wire rope or pulling strap.

Figure 9:
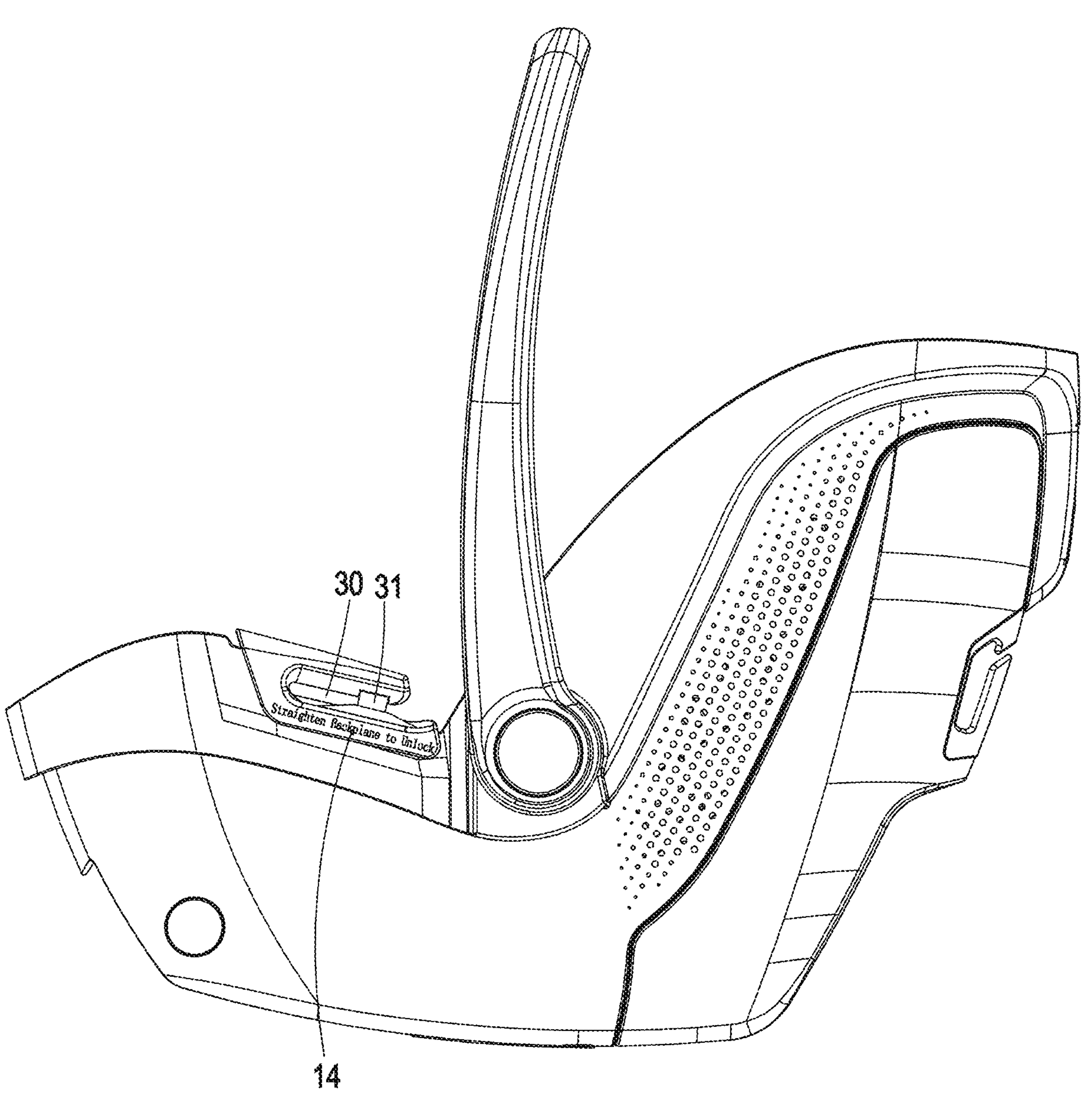
FIG. 9 is a side view of the child carrier according to the above preferred embodiment of the present invention.

As shown in FIG. 9, an operation instruction label 14 is located near the seat belt interference assembly 3 to guide the user on how to unlock it, effectively preventing confusion and ensuring that the car seat belt 6 can be properly connected to the seat belt fitting part 30.

As shown in FIGS. 2, 8, 10 and 11, the child carrier also comprises a blocking element 4 located at a bottom of carrier body 1 for preventing the carrier body 1 from connecting to the car seat or an independent base. The blocking element 4 is locked to the carrier body 1 with a locking unit 5 which is configured to be unlocked through the adjustment mechanism 2 when the back support panel 13 is at the highest angle position. This ensures safety and prevents forgetting to adjust the back support panel 13 to the highest angle position during the car seat usage state, so as to ensure the safety of the occupants. Furthermore, the locking unit 5 is interconnected and linked with the adjustment mechanism 2 for unlocking, allowing the user to unlock multiple locking mechanisms with a single action.

Figure 1:
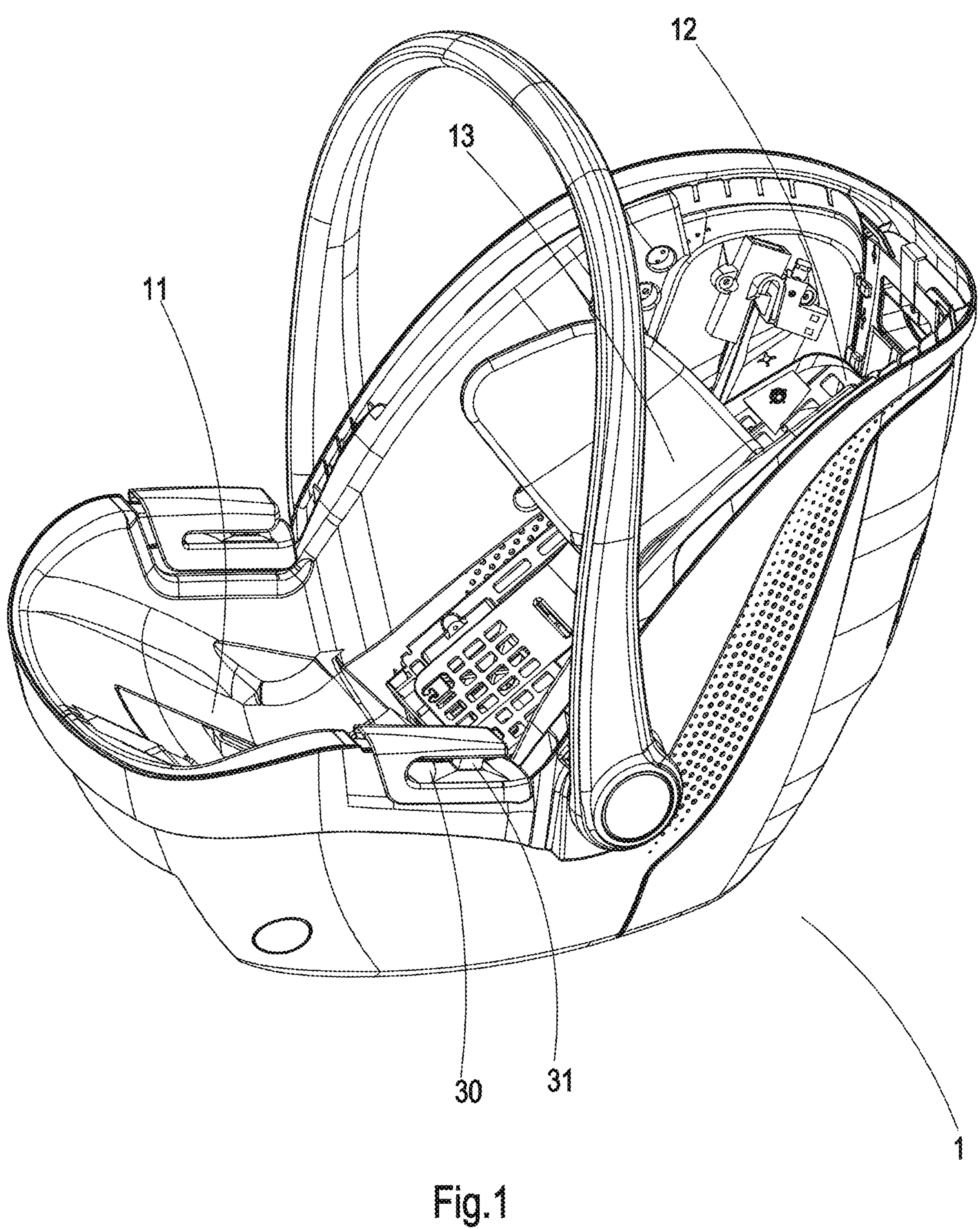
FIG. 1 is a perspective view of a child carrier according to a preferred embodiment of the present invention, wherein a back support panel is at a lowest angle position.
Figure 2:
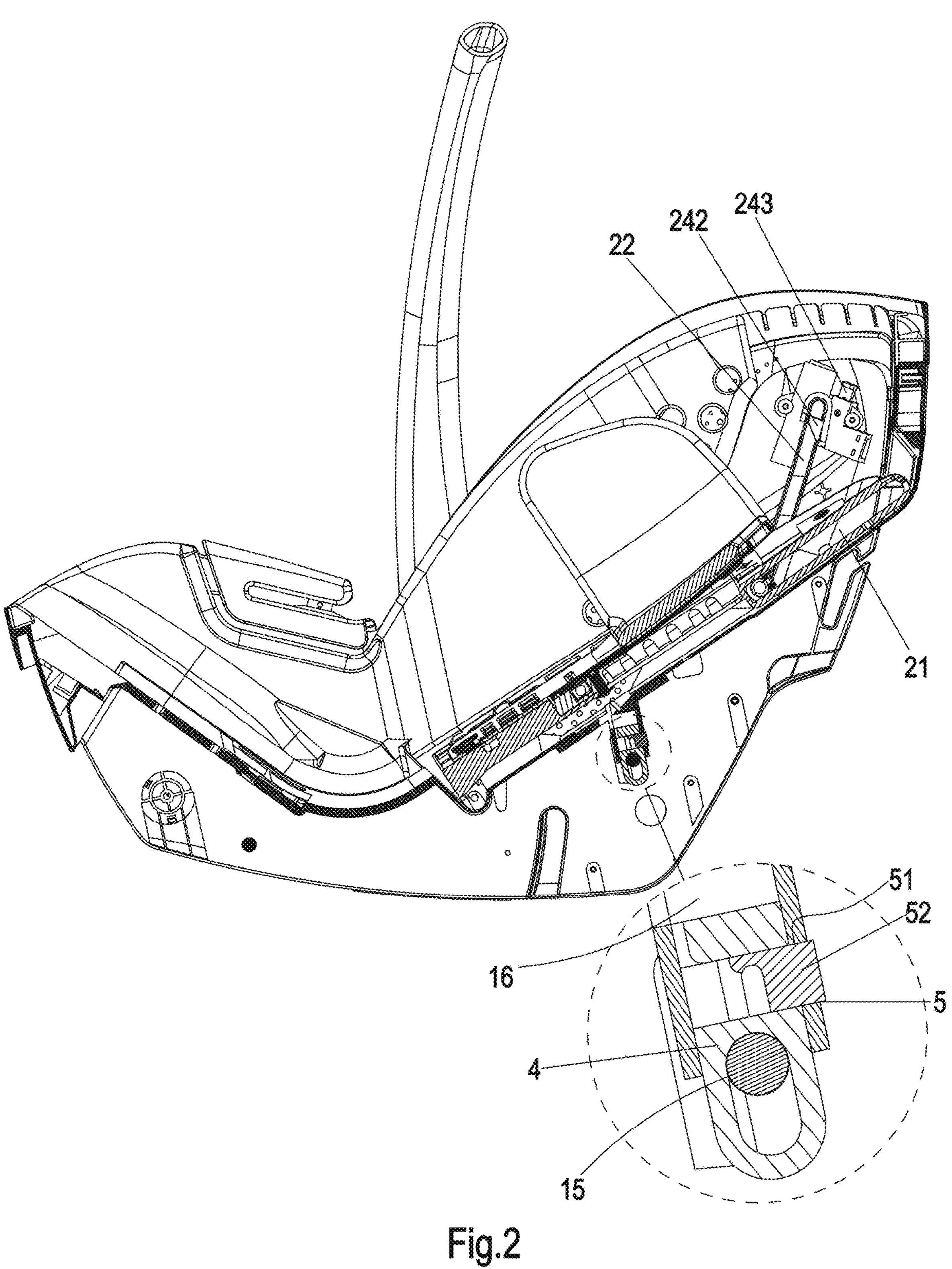
FIG. 2 is a cross-sectional view illustrating the back support panel of the child carrier being at the lowest angle position according to the above preferred embodiment of the present invention.
Figure 8:
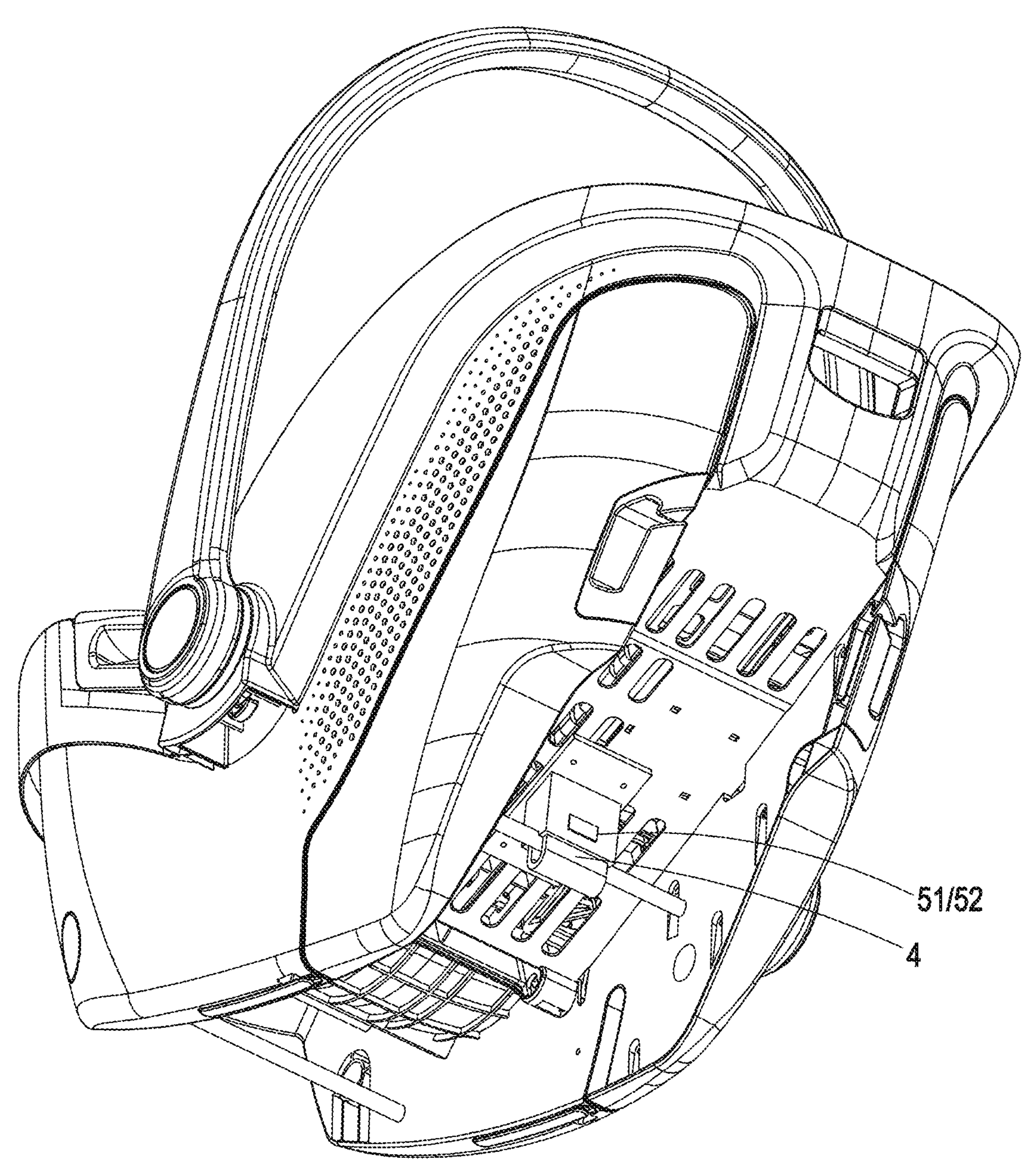
FIG. 8 is a schematic view illustrating a bottom structure of the child carrier according to the above preferred embodiment of the present invention.
Figure 11:
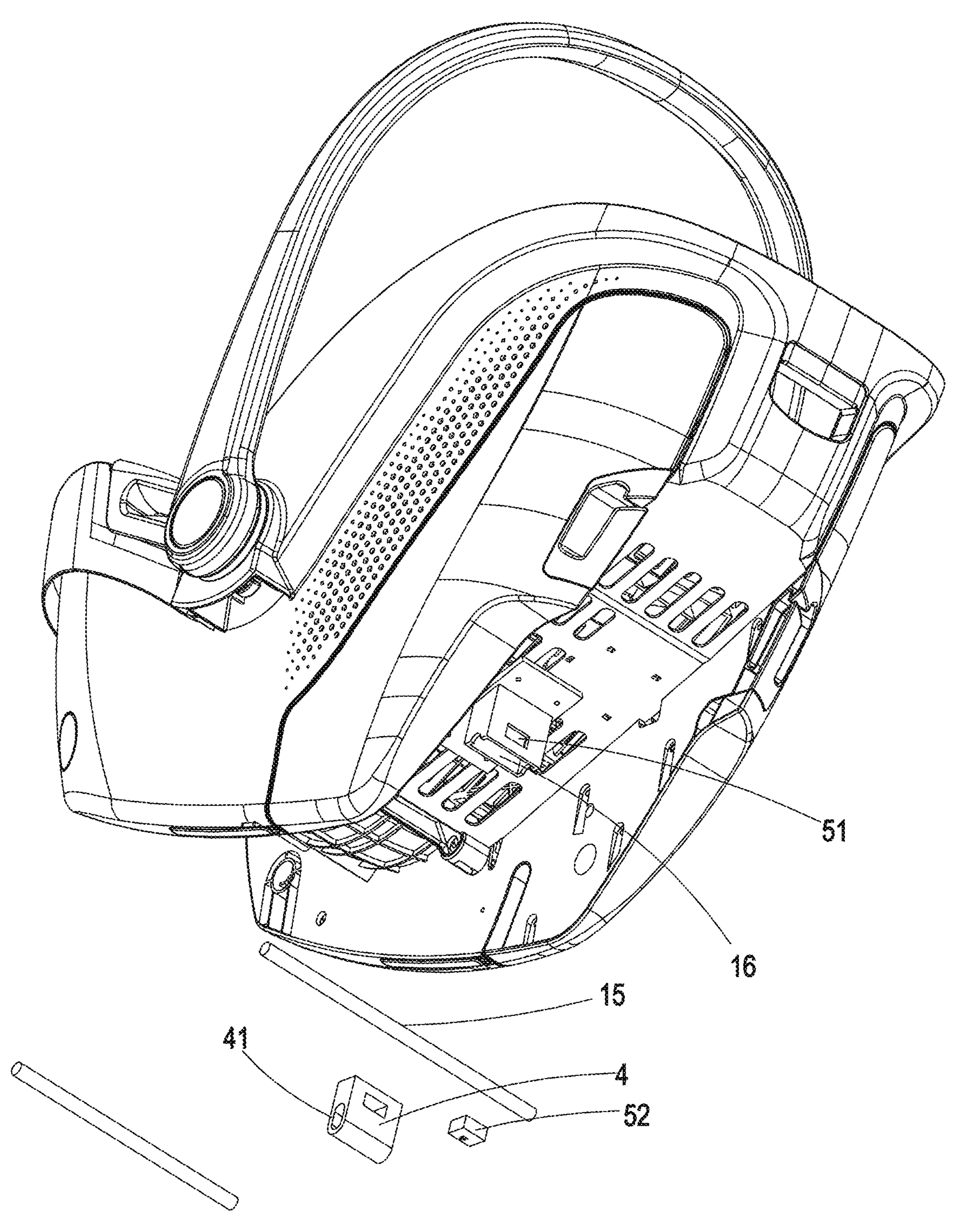
FIG. 11 is another exploded view of the child carrier according to the above preferred embodiment of the present invention.

As shown in FIGS. 2, 8, and 11, in order to better lock the blocking element 4 facilitate the unlocking of the blocking element 4, the locking unit 5 has a locking hole 51 at the bottom of the carrier body 1 and comprises a locking slider 52 movable on the blocking element 4 and can slide into the locking hole 51 to lock the blocking element 4 to the carrier body 1. A slider reset spring 53 can be provided to reset the locking slider 52 which is coupled to the blocking element 4, so as to keep the locking slider 52 being resiliently inserted into the locking hole 52. The locking slider 52 can also be unlocked through the adjustment mechanism 2.

More specifically, in this embodiment, the locking unit 5 comprises a second pulling rope 54 which is connected between the locking slider 52 and the unlocking component 33. When the unlocking component 33 is pushed upward by the adjustment slide rod 23, the unlocking component 33 will drive the locking slider 52 to move away from the locking hole 51 through the second pulling rope 54 which can be embodied as a steel wire rope or pulling strap. A bottom side of the carrier body 1 is provided with an installation rod 15 and a retaining groove 16, the installation rod 15 is penetrating through a penetrating hole 41 of the blocking element 4 which is movable in the retaining groove 16. When the unlocking component 33 drives the locking slider 52 to leave the locking hole 51, so as to drive an upper part of the blocking element 4 to move into the retaining groove 16, so that change the relative position between the installation rod 15 and the blocking element 4 in a manner that the installation rod 15 is moved to bias against a bottom wall of the penetrating hole 41, so that the blocking element 4 will not block the installing of the installation rod 15 into an installation groove 71 of an independent base 7 on a car seat.

The operation principle is as follows. When the child carrier needs to be connected to the base 7 on a car seat, the blocking element 4 is protruded out of the retaining groove 16 to prevent the child carrier from connecting to the base 7, and the seat belt interference assembly 3 blocks the car seat belt 6 from fitting with the seat belt fitting part 30. To proceed, the back support panel 13 must first be adjusted to the highest angle position, which causes the back support panel 13 to rotate around its pivot axis, reducing the angle between the movable sliding groove 21 and the fixed sliding grooves 22, pushing the adjustment slider 23 upwards until the adjustment slider 23 is locked in place by the locking mechanism 24, as shown in FIGS. 4 to 6. The adjustment slider 23 then pushes the unlocking component 33 upwards, causing the unlocking component 33 to retract the interference block 31 by the first pulling rope 34, which opens the seat belt fitting slot 301, allowing the car seat belt 6 to pass through. Simultaneously, the unlocking component 33 retracts the locking slider 52 by the second pulling rope 54, unlocking the blocking element 4, allowing the child carrier to be connected to the base 7, this completes the correct setup for the child carrier.

Figure 12:
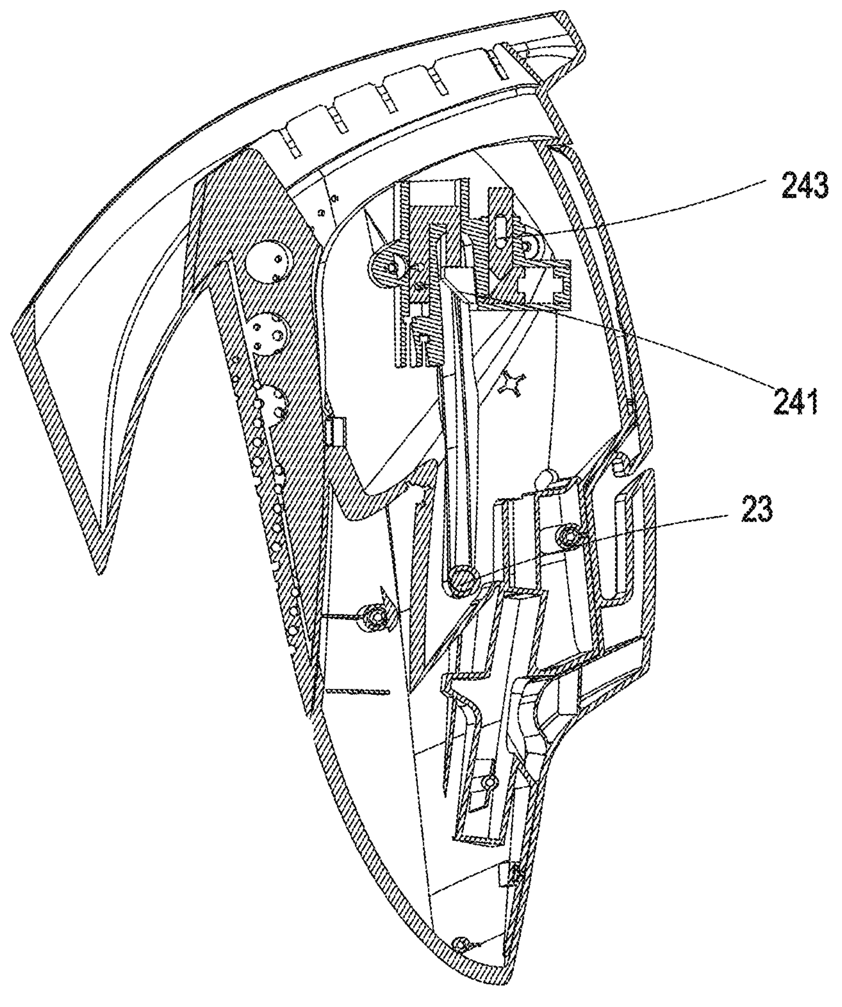
FIG. 12 is a schematic view illustrating an adjustment slider and a locking mechanism of the child carrier according to the above preferred embodiment of the present invention, wherein the adjustment slider is shown to be positioned under a locking block.
Figure 13:
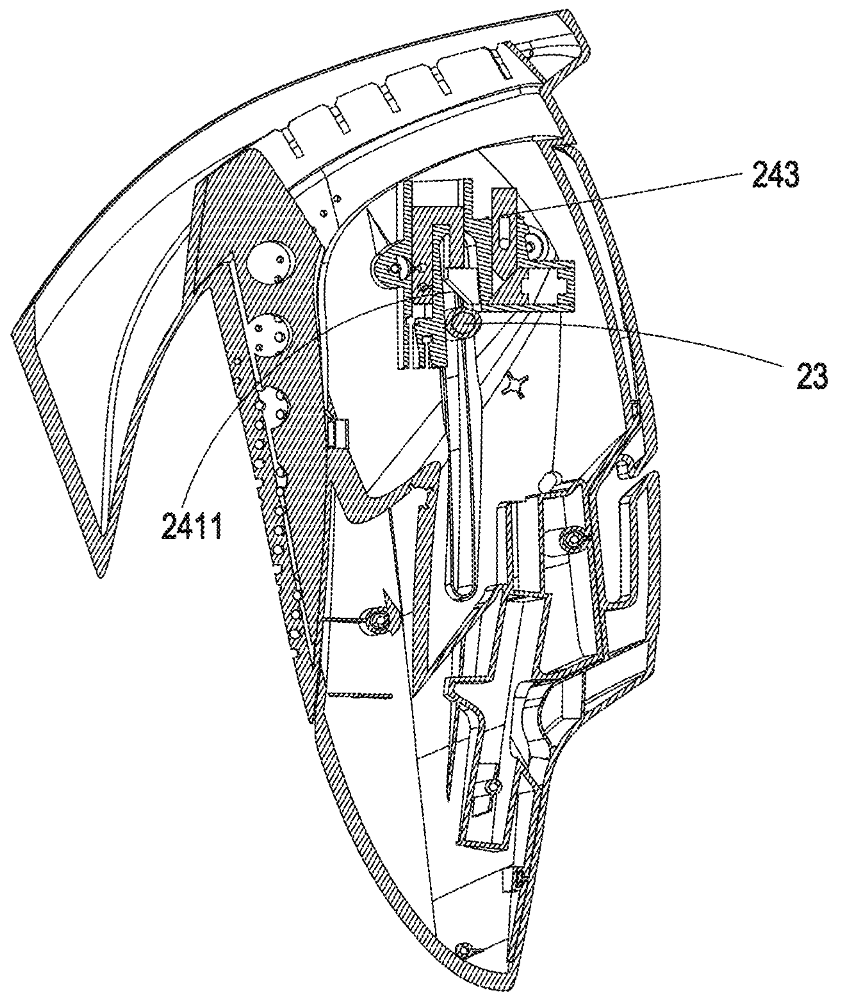
FIG. 13 is a schematic view illustrating the adjustment slider and the locking mechanism of the child carrier according to the above preferred embodiment of the present invention, wherein the adjustment slider is shown to be acting on a guiding inclined surface of the locking block.

More specifically, as shown in FIG. 12, when the back support panel 13 is in the lowest angle position, the adjustment slider 23 is positioned at lower parts of the sliding grooves 21 and 22. As shown in FIG. 13, when the adjustment slider 23 is sliding upward along the sliding grooves 21 and 22, the adjustment slider 23 will push the guiding inclined surface 2411 of the locking block 241 to drive the locking block 241 to retract, so as to allow the adjustment slider 23 to be slid to a position above the locking block 241. And once the adjustment slider 23 is positioned above the locking block 241, the locking block 241 returns to its original position to lock the adjustment slider 23 and prevent the downward movement of the adjustment slider 23.

Figure 14:
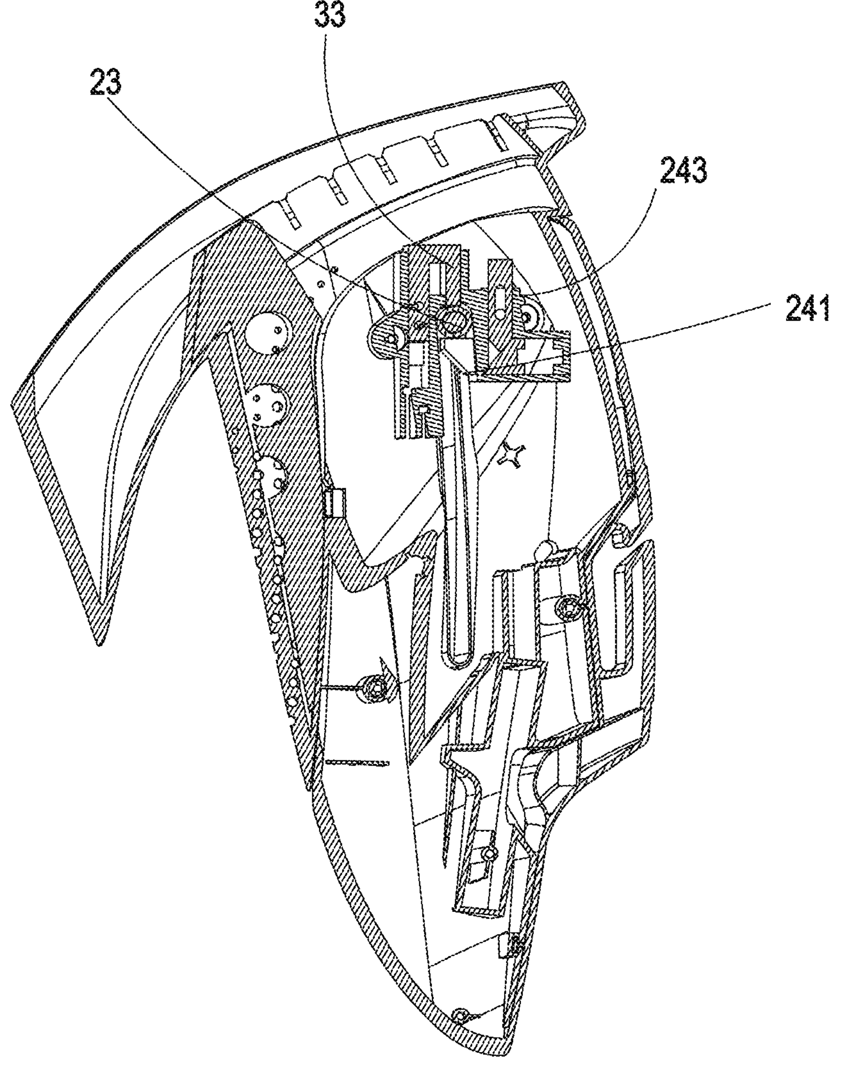
FIG. 14 is a schematic view illustrating the adjustment slider and the locking mechanism of the child carrier according to the above preferred embodiment of the present invention, wherein the adjustment slider is shown to be positioned above the locking block.

As shown in FIG. 14, when the adjustment slider 23 is moved to a position above the locking block 241, the adjustment slider 23 will push the unlocking component 33 to move upward, so as to simultaneously drive the interference block 31 to move to allow the seat belt fitting slot 301 to be in an open state for engaging with the car seat belt 6, and drive the locking slider 52 to move to release the blocking element 4 to allow the child carrier to be connected to the base.

Figure 15:
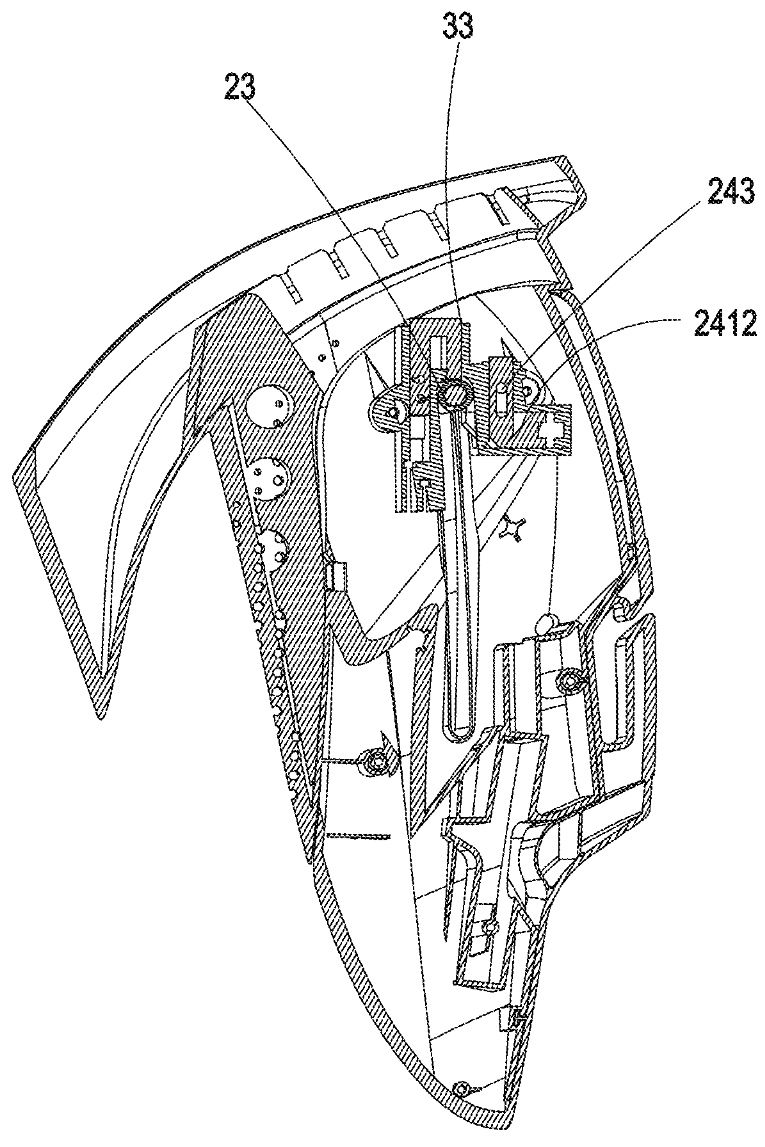
FIG. 15 is a schematic view illustrating the adjustment slider and the locking mechanism of the child carrier according to the above preferred embodiment of the present invention, wherein an unlocking linkage button is shown to be acting on an unlocking inclined surface of the locking block.

As shown in FIG. 15, when the unlocking linkage button 243 is pressed, the unlocking linkage button 243 will push the unlocking inclined surface 2412 of the locking block 241, so as to drive the locking block 241 to retract, so as to allow the adjustment slider 23 move downward to a position under the locking block 24.

Figure 18:
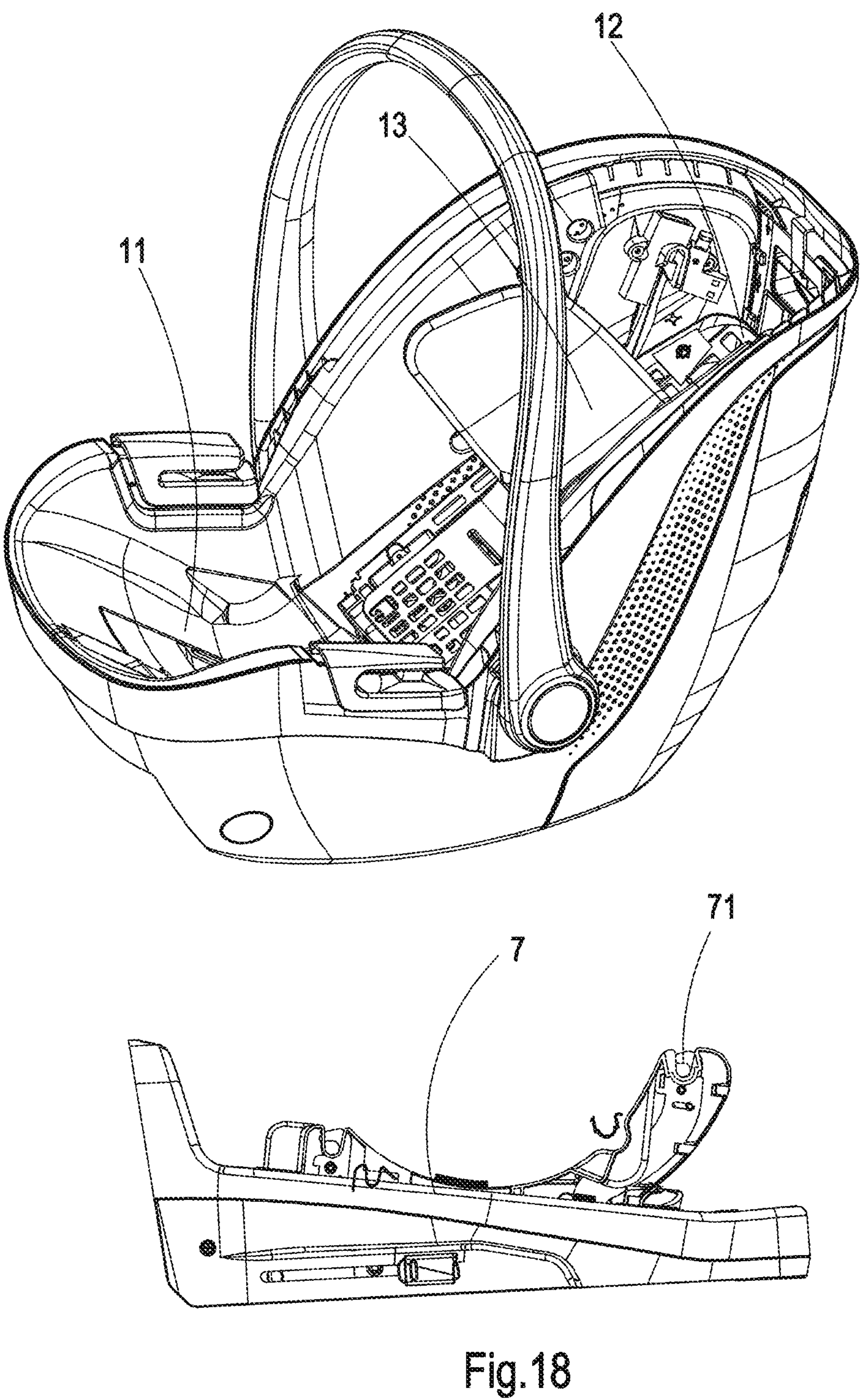
FIG. 18 is a perspective view illustrating the child carrier being aligned with an independent base on a car seat according to the above preferred embodiment of the present invention.
Figure 19:
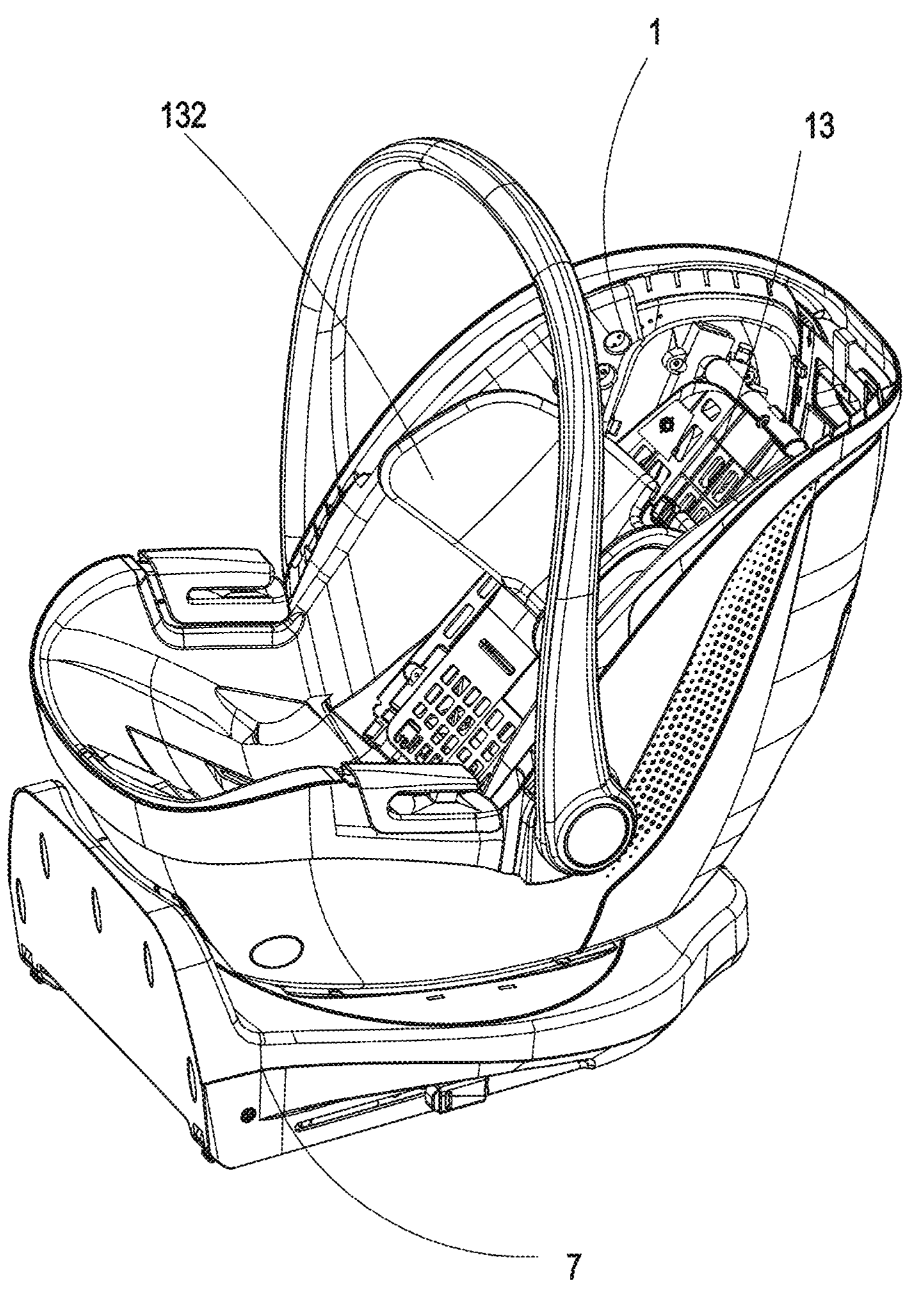
FIG. 19 is a perspective view illustrating the child carrier being assembled on the independent base on a car seat according to the above preferred embodiment of the present invention.
Figure 20:
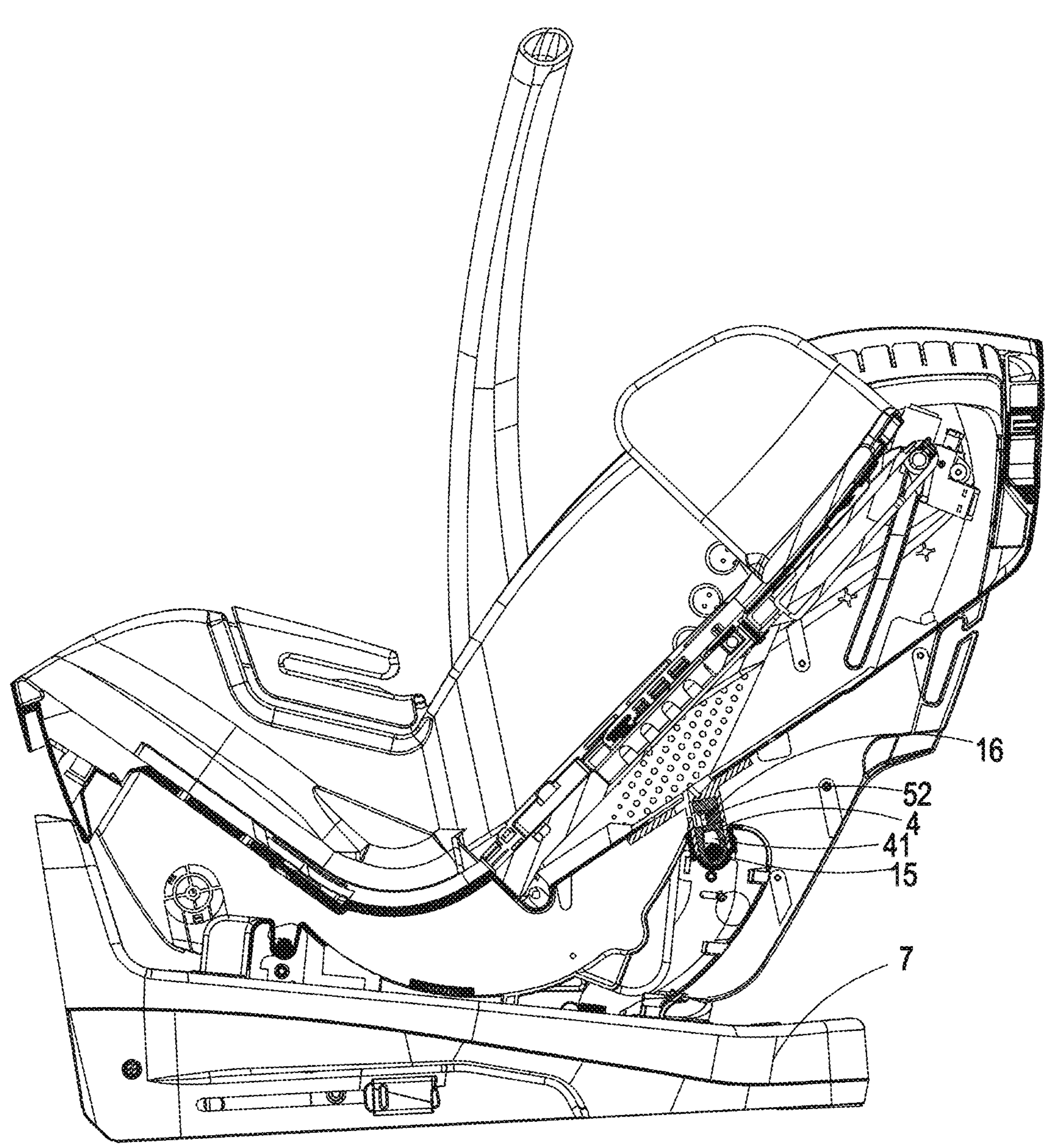
FIG. 20 is a schematic view illustrating the child carrier being connected to an independent base for use according to the above preferred embodiment of the present invention.

As shown in FIGS. 16 to 18, when the child carrier is connected to the independent base 7 on a car seat, the blocking element 4 is retraced and the installation rod 15 is fitted into the installation groove 71 of the base 7.

One skilled in the art will understand that the embodiment of the present invention as shown in the drawings and described above is exemplary only and not intended to be limiting.

It will thus be seen that the objects of the present invention have been fully and effectively accomplished. The embodiments have been shown and described for the purposes of illustrating the functional and structural principles of the present invention and are subject to change without departure from such principles. Therefore, this invention includes all modifications encompassed within the spirit and scope of the following claims.

What is claimed is:

1. A child carrier, comprising:

a carrier body which comprises a seat part, a backrest part, and a back support panel provided at an inner side of said backrest part, wherein said back support panel comprises a headrest portion and is rotatably mounted to said backrest part;

an adjustment mechanism arranged between said back support panel and said backrest part to adjust said back support panel between a highest angle position and a lowest angle position;

a seat belt fitting part provided on said carrier body; and a seat belt interference assembly which is configured to allow a car seat belt to fit with said seat belt fitting part when said back support panel is at said highest angle position, and to block the car seat belt from fitting with said seat belt fitting part when said back support panel is not at said highest angle position.

2. The child carrier, as recited in claim 1, wherein said seat belt fitting part has a seat belt fitting slot, wherein said seat belt interference assembly is operatively linked to said adjustment mechanism in a manner that when said adjustment mechanism locks said back support panel at said highest angle position, said seat belt interference assembly is driven by said adjustment mechanism to open said seat belt fitting slot.

3. The child carrier, as recited in claim 1, wherein said adjustment mechanism is configured to allow said back support panel to be adjusted between said highest angle position and said lowest angle position when the child carrier is in a stroller usage state.

4. The child carrier, as recited in claim 2, wherein a lower side of said back support panel is pivotally connected to said backrest portion, wherein said adjustment mechanism has a movable sliding groove at said back support panel and a fixed sliding groove at said backrest portion, wherein said movable sliding groove and said fixed sliding groove intersect, wherein said adjustment mechanism comprises a locking mechanism on said backrest portion and an adjustment slider which is slidably coupled with both of said movable sliding groove and said fixed sliding groove, wherein when said back support panel is at said highest angle position, said locking mechanism locks said adjustment slider with respect to said backrest portion.

5. The child carrier, as recited in claim 4, wherein said locking mechanism comprises a locking block which is slidably positioned on said backrest part, a blocking reset spring provided between said locking block and said backrest part, and an unlocking linkage button coupled to said locking block, wherein when said back support panel is at said highest angle position, said locking block prevents said adjustment slider from moving downward.

6. The child carrier, as recited in claim 5, wherein said locking block comprises a guiding inclined surface and an unlocking inclined surface at two sides thereof, wherein said adjustment slider is configured to act on said guiding inclined surface to allow said adjustment slider to be positioned above said locking block, wherein said unlocking linkage button is configured to act on said unlocking inclined surface to retract said reset spring, so as allow said adjustment slider to slide downward to a position under said locking block.

7. The child carrier, as recited in claim 2, wherein said seat belt interference assembly comprises an interference block which is slidable on said carrier body to open or close said seat belt fitting slot, a reset spring to maintain said seat belt fitting slot in a closed state, and an unlocking component coupled to said interference block and said adjustment mechanism to release said interference block when said back support panel is at said highest angle position.

8. The child carrier, as recited in claim 5, wherein said seat belt interference assembly comprises an interference block which is slidable on said carrier body to open or close said seat belt fitting slot, a reset spring to maintain said seat belt fitting slot in a closed state, and an unlocking component coupled to said interference block and said adjustment mechanism to release said interference block when said back support panel is at said highest angle position.

9. The child carrier, as recited in claim 7, wherein said seat belt interference assembly comprises a first pulling rope connected between said interference block and said unlocking component, wherein when said back support panel is at said highest angle position, said adjustment mechanism drives said unlocking component to move, so as to allow said unlocking component to drive said interference block to open said seat belt fitting slot through said first pulling rope.

10. The child carrier, as recited in claim 8, wherein said seat belt interference assembly comprises a first pulling rope connected between said interference block and said unlocking component, wherein when said back support panel is at said highest angle position, said adjustment mechanism drives said unlocking component to move, so as to drive said interference block to open said seat belt fitting slot through said first pulling rope.

11. The child carrier, as recited in claim 10, wherein when said back support panel is at said highest angle position, said adjustment slider is slid to a position above said locking block to drive said unlocking component to move upward, so as to pull said first pulling rope to drive a movement of said interference block.

12. The child carrier, as recited in claim 1, further comprising a blocking element provided at a bottom of said carrier body to block a connection between said carrier body and a car seat or an independent base on the car seat, and a locking unit provided between said blocking element and said carrier body to unlock and release said blocking element when said back support panel is at said highest angle position.

13. The child carrier, as recited in claim 2, further comprising a blocking element provided at a bottom of said carrier body to block a connection between said carrier body and a car seat or an independent base on the car seat, and a locking unit provided between said blocking element and said carrier body to unlock and release said blocking element when said back support panel is at said highest angle position.

14. The child carrier, as recited in claim 4, further comprising a blocking element provided at a bottom of said carrier body to block a connection between said carrier body and a car seat or an independent base on the car seat, and a locking unit provided between said blocking element and said carrier body to unlock and release said blocking element when said back support panel is at said highest angle position.

15. The child carrier, as recited in claim 8, further comprising a blocking element provided at a bottom of said carrier body to block a connection between said carrier body and a car seat or an independent base on the car seat, and a locking unit provided between said blocking element and said carrier body to unlock and release said blocking element when said back support panel is at said highest angle position.

16. The child carrier, as recited in claim 12, wherein said carrier body has a retaining groove, said locking unit has a locking hole at said bottom of said carrier body and comprises a locking slider on said blocking element that is capable of being inserted into said locking hole to lock said blocking element, and a slider reset spring to keep said locking slider be in said locking hole, wherein said locking slider is unlocked by said adjustment mechanism.

17. The child carrier, as recited in claim 13, wherein said carrier body has a retaining groove, said locking unit has a locking hole at said bottom of said carrier body and comprises a locking slider on said blocking element that is capable of being inserted into said locking hole to lock said blocking element, and a slider reset spring to keep said locking slider be in said locking hole, wherein said locking slider is unlocked by said adjustment mechanism.

18. The child carrier, as recited in claim 14, wherein said carrier body has a retaining groove, said locking unit has a locking hole at said bottom of said carrier body and comprises a locking slider on said blocking element that is capable of being inserted into said locking hole to lock said blocking element, and a slider reset spring to keep said locking slider be in said locking hole, wherein said locking slider is unlocked by said adjustment mechanism.

19. The child carrier, as recited in claim 15, wherein said carrier body comprises an installation rod and has a retaining groove, said locking unit has a locking hole at said bottom of said carrier body and comprises a locking slider on said blocking element that is capable of being inserted into said locking hole to lock said blocking element, and a slider reset spring to keep said locking slider be in said locking hole, wherein said blocking element has a penetrating hole to allow said installation rod to pass therethrough, wherein said locking unit comprises a second pulling rope connected between said locking slider and said unlocking component, wherein when back support panel is at said highest angle position, said adjustment mechanism drives said unlocking component to move, so as to allow said unlocking component to drive said locking slider to leave said locking hole through said second pulling rope.

20. The child carrier, as recited in claim 2, further comprising an operation instruction label provided on said carrier body adjacent to said seat belt interference assembly.

* * * * *